United States Patent [19]

Narita et al.

[11] Patent Number: 5,721,481

[45] Date of Patent: Feb. 24, 1998

[54] BATTERY CHARGER FOR AN ELECTRONIC DEVICE AND A SPARE BATTERY

[75] Inventors: Izuru Narita, Sagamihara; Toshitsugu Mito, Atsugi, both of Japan

[73] Assignee: International Business Machines Corp., Armonk, N.Y.

[21] Appl. No.: 610,604

[22] Filed: Mar. 8, 1996

[30] Foreign Application Priority Data

Mar. 8, 1995 [JP] Japan .................................. 7-048753

[51] Int. Cl.$^6$ ...................................................... A02J 7/011
[52] U.S. Cl. .............................. 320/34; 320/14; 320/56; 307/46; 307/66
[58] Field of Search .............................. 320/14, 15, 16, 320/20, 36, 43, 56, 33, 84; 307/18, 19, 44, 46, 66

[56] References Cited

U.S. PATENT DOCUMENTS

| | | | |
|---|---|---|---|
| 5,557,738 | 9/1996 | Townsley et al. | 395/182.12 |
| 5,563,493 | 10/1996 | Matsuda et al. | 320/6 |
| 5,572,110 | 11/1996 | Dunstan | 320/30 |
| 5,583,417 | 12/1996 | Yuen | 320/22 |

*Primary Examiner*—Peter S. Wong
*Assistant Examiner*—Gregory J. Toatley, Jr.
*Attorney, Agent, or Firm*—George E. Grosser

[57] ABSTRACT

Disclosed is a battery charger that can be connected in series to a power feed line, which lies between an external power source and an electric/electronic device, and that monitors the power consumption state of the electric/electronic device and begins and halts the charging of a battery in consonance with the power consumption state.

Since a battery charger according to the present invention can be inserted in series into a power feed line that lies between an AC/DC adaptor and an electric/electronic device, the wiring arrangement is not complicated and a spare battery can be automatically charged. Since the charging is performed only during a period in which power consumption by the electric/electronic device is relatively low, the charging operation does not affect the system operation. As the battery charger does not require AC to DC conversion circuit, it is compact and light and is suitable for use along with a portable device. Further, when the spare battery pack is carried with being attached into the battery charger, the volume is not great, and as the terminal portions of the battery are covered and are protected from coming into contact with foreign conductive material, the possibility that the electrodes of the battery will be short-circuited can be prevented. To use a notebook computer while staying at a hotel on a business trip, a user need merely connect in series an AC/DC adaptor, a Travel Quick Charger, and a notebook computer in the named order via a power supply cord. The spare battery can be attached into a Travel Quick Charger while being carried to the destination.

8 Claims, 8 Drawing Sheets

BATTERY CHARGER FOR AN ELECTRONIC DEVICE AND A SPARE BATTERY

Applicants hereby claim the benefit of foreign priority under 35 USC 119 of Japan Application 7-048753, Filed on Mar. 8, 1995. A certified copy of Japan Application 7-048753 has filed with this patent application.

FIELD OF THE INVENTION

The present invention relates to a battery charger for a rechargeable battery that is employed with an electric/electronic device, such as a notebook computer, and in particular, to a battery charger for charging a spare battery pack that has the same specifications as the battery pack incorporated in an electric/electronic device. More specifically, the present invention relates to a battery charger that can be connected to a power feed line that is employed to supply power from a commercially available power source to an electric/electronic device, and that can be transported while a battery pack is attached into it and can thus prevent the battery terminals from being short-circuited.

BACKGROUND

As the technique has progressed, compact and light electric/electronic devices, for which portability has been a primary design consideration and for which the so-called notebook computers (hereinafter referred to simply as "PCs" or "systems") provide a good example, have come to be manufactured and are now in widespread use. Ordinarily, such electric/electronic devices can internally accommodate battery packages (i.e., "battery packs"), which are composed by connecting together a plurality of battery cells. The electric/electronic devices can thus be powered by the battery pack at sites where there are no external AC power sources (generally, commercially available power sources). Rechargeable batteries, such as NiCd, NiMH, and Li-Ion batteries, which can be recycled by being charged, are employed as battery cells. The charging of such battery packs is performed by dedicated AC chargers. The charging process may be performed while the battery packs are retained within the bodies of the powered devices.

FIG. 1(a) is a schematic diagram illustrating a power supply system for a common notebook computer 100. In FIG. 1(a), the PC 100 is connected in parallel to the output terminals of an AC/DC adaptor 10, which converts an AC voltage from an external power source into a DC voltage, and to the output terminals of an incorporated battery pack 30. The PC 100 can thus be driven by either power source. A DC/DC converter 20 reduces the direct current voltage that is supplied from the power sources 10 and 30 to a voltage level that is proper for the driving of electric circuits in the system 100, and distributes the reduced voltage to individual sections within a system load 40. The system load 40 comprises a number of electric circuits (a CPU, a main memory, a peripheral controller, I/O devices, etc.) that are mounted on system boards which are provided inside the case of the PC 100. The charging of the battery 30 is performed by opening and closing a switch SW, which is inserted into the power feed line, in consonance with the operational state of the system load 40, and by using excess power that is supplied by the AC/DC adaptor 10 as a charging current for the battery 30.

The design of one battery pack, which is employed with a notebook computer, provides for the parallel arrangement of two separate sets of eight serially connected battery cells each, for example. The charge capacity of a fully charged battery pack is about 3.6 AH, which will provide an operating time for the notebook computer of only about two hours. A user, therefore, must not only load a battery pack into the PC 100, but also must carry another battery pack, as an extra item (i.e., a spare).

When a user carries a spare battery pack, the following two problems may be brought about.

(1) The first problem is the short-circuiting of the electrodes of a battery pack.

With most types of battery packs, provided on one side of the cases are various kinds of exposed output terminals, including positive electrodes and negative electrodes. Therefore, when such a battery pack is hastily dropped into a bag, and is shifted and tossed around while the bag is being carried, foreign material having conductivity (e.g., clips) that are in the bag may contact the battery pack and electrically connect the positive electrode and the negative electrode. As a result, power will be consumed wastefully, and the battery may become hot and cause a fire. As long as a battery pack is accommodated within a notebook computer, the electrodes can be insulated from each other so long as the power source of the device has been turned off. However, when a battery pack is carried with its electrodes uncovered, it is easy for a short circuit of the electrodes to occur. The probability of the electrodes of an unprotected battery being short-circuited would be easily understood by one having ordinary skill in the art.

(2) The second problem concerns the charging of a spare battery pack.

Since a spare battery pack is employed to extend the short duration of the battery pack 30, it is preferable that such a spare battery pack would be constantly maintained in a fully charged state. For the charging of the main battery pack 30, the excess power among that provided by the AC/DC adaptor 10 can be employed under the control of the notebook computer. That is, as long as the AC/DC adaptor 10 is inserted into the notebook computer, the system 100 will automatically and occasionally charge the incorporated battery pack 30 (a well known procedure). It is because the battery pack 30 is installed within the PC body. On the other hand, since a spare battery pack is physically separated from the system 100, the charging of it can not be performed by the system 100. Technically, a dedicated charger, which is already widely known, can be used to charge a spare battery pack. However, if the charger must be carried in addition to the PC, the AC/DC adaptor, and the spare battery pack, the principal merit of the notebook computer, say portability, would be degraded. This is especially true when the dedicated charger, which may commonly incorporate circuit for converting AC voltage to DC voltage (e.g., a transformer coil or a rectifying and smoothing circuit), is relatively large and fills a user's bag.

And when a user, during the course of business trip, staying at a hotel employs a notebook computer there, the use of a power line hookup such as is shown in FIG. 1(b) is required other than the power line hookup for the AC/DC adaptor and the PC 100 (see FIG. 1(a)). For the user, such a setup is complicated, since two power connections must be made. Further, since this setup requires the user to make a conscious effort in order to charge the spare battery pack, it is not an intelligent arrangement. It is desirable, to provide a simplified mechanism for charging a spare battery pack that can be installed on the original power supply line running from the AC/DC adaptor to the PC 100.

In other words, in order to use a spare battery pack, first, it is necessary to ensure the safely in transporting. Second, a power supply system for charging the spare battery pack must be provided.

SUMMARY OF THE PRESENT INVENTION

According to a first aspect of the present invention, a battery charger, which can be connected in series with a power feed line that is positioned between an external power source and an electric/electronic device, monitors a power consumption state of the electric/electronic device and exercises control to begin and to halt a charging function for a battery in consonance with the power consumption state.

According to a second aspect of the present invention, a battery charger that can be connected in series with a power feed line, along which an AC/DC adaptor supplies a drive current to an electric/electronic device, monitors a power consumption state of the electric/electronic device and begins or halts a charging function for a battery in consonance with the power consumption state.

According to a third aspect of the present invention, a battery charger that can be connected in series with a power feed line that lies between an external power source and an electric/electronic device, monitors an operating mode of the electric/electronic device and exercises control to begin and to halt a charging function for a battery in consonance with the operating mode.

According to a fourth aspect of the present invention, a battery charger that can be connected in series with a power feed line, along which an AC/DC adaptor supplies a drive current to an electric/electronic device, monitors an operating mode of the electric/electronic device and begins or halts a charging for a battery in consonance with the operating mode.

A battery charger according to the third or the fourth aspect can charge a spare battery when an electric/electronic device enters power saving mode, such as a suspend mode (which will be described later). It is because there is little or no power consumption by the system during the power saving mode.

According to a fifth aspect of the present invention, a battery charger that can be connected in series with a first power feed line, along which an AC/DC adaptor supplies a drive current to an electric/electronic device, comprises: a first switch for connecting and disconnecting the first power feed line; a second power feed line that is connected in parallel to the first power feed line to supply at least part of the drive current as a charging current for a battery; a second switch for connecting and disconnecting the second power feed line; and a charge controller for controlling the opening and the closing of the first switch and the second switch.

In a battery charger according to the fifth aspect, the charge controller selectively connects one switch of the first switch and the second switch, so that power is supplied to either an electric/electronic device or a spare battery.

The charge controller not only monitors the power consumption state or the operating mode of the electric/ electronic device, but also examines a charged state by employing detection values for a voltage, a current, and a temperature of the battery, and controls the opening and the closing of the first switch and the second switch. In other words, when the electric/electronic device is in a normal operating mode, or when the battery is in a fully charged state, the first switch is closed and the second switch is opened. On the contrary, when the electric/electronic device is in a low power consumption mode (or when power is off), and the battery is not in the fully charged state, the first switch is opened and the second switch is closed. When the electric/electronic device incorporates a battery pack and an external charger, the first switch is closed and the second switch is opened even during the charging of the incorporated battery pack. In other words, a battery charger according to the present invention preferentially performs the supply of power to an electric/electronic device.

FIG. 2 is a specific diagram illustrating the arrangement of a battery charger according to the fifth aspect of the present invention. In FIG. 1, a battery charger 50 is connected in series between power feed lines L and L', so that lie between an AC/DC adaptor 10 and a PC 100. A spare battery 30' that has the same specification as a battery 30 incorporated in the PC 100, can be attached into the charger 50. The charger 50 includes a power feed line 1, which is connected in parallel with the power feed line L to supply power to the battery 30'; a switch SW1, for the connection and disconnection of the power feed lines L and L'; a switch SW2, for the connection and disconnection of the power feed line 1; and a charge controller 52 for opening and closing the SW1 and the SW2. The charge controller 52 selectively closes the SW1 or the SW2, as needed, by monitoring physical values such as the output current and the input voltage of the battery 30' and the internal temperature of a battery pack, and a power consumption state of the system load 40.

According to a sixth aspect of the present invention, a battery charger, which can be connected in series to a first power feed line along which an AC/DC adaptor supplies a drive current to an electric/electronic device, comprises: a second power feed line, which is connected in parallel with the first power feed line, for supplying the drive current to a battery; a switch for connecting and disconnecting the second power feed line; and a charge controller for opening and closing the switch by monitoring a current and a voltage across the first power feed line, and a current, a voltage and a temperature of the battery.

The charge controller opens the switch when the intensity of the current across the power feed line falls below the minimum permissible charging current, when the intensity of a current that is supplied across the first power feed line falls below that which is required for the operation of the electric/electronic device, or when the battery is in a fully charged state and closes the switch in the other period. As well as in a battery charger according to the fifth aspect, a battery charger in this aspect preferentially gives a first priority to powering the electric/electronic device rather than charging the spare battery pack.

Since a battery charger according to the present invention can be connected in series with power feed lines that lie between an AC/DC adaptor and an electric/electronic device, the wiring is not complicated for a user. In addition, merely by inserting a battery charger between power supply cords that runs from an AC power source, a spare battery can be charged automatically.

Further, since the charging is performed only during a period while the power consumption of an electric/electronic device is relatively low, this process will not affect the operation of the electric/electronic device.

The battery charger does not include a circuit for AC to DC conversion. In other words, since a transformer coil and a rectifying and smoothing circuit are not incorporated, the battery charger is more compact and lighter than a conventional dedicated charger that has an AC function, and thus has an appropriate size for carrying.

The battery charger can be so designed and manufactured that only that part of the surface of a battery pack on which the terminal portions are provided. When a spare battery pack is carried while it is attached into the battery charger, the bag will not be bulky. Further, the terminal portions of the battery will be protected so that you can avoid the possibility of causing short-circuited by coming into contact with foreign material.

When no battery pack is attached into the battery charger, even when it is connected to the power feed line between the AC/DC adaptor and the electric/electronic device, the supply of a charging current is halted. Therefore, it is not necessary to be concerned about a possible power leakage at the connector of the battery charger.

A battery charger according to the present invention greatly differs, in its arrangement and its function, from a conventional quick charger with an AC adaptor function, and from a DC quick charger that is incorporated in an electric/electronic device. Just for the purpose of distinguishing it from these conventional chargers, a battery charger according to the present invention is hereinafter called a Travel Quick Charger. It should be understood that the use of "Travel" implies the intent behind the development of this charger, say the useful service during the course of travel. To use a notebook computer driven by AC power source at a hotel room, user must simply connect in series together an AC/DC adaptor, a Travel Quick Charger, and the notebook computer in the given order. While traveling to the next destination, the user need only carry a spare battery with being attached into the Travel Quick Charger.

Other objects, features, and advantages of the present invention will become apparent during the course of the following detailed explanation, which is given while referring to the embodiments of the present invention and the accompanying drawings.

DETAILED DESCRIPTION OF THE PREFERRED EMBODIMENTS

For convenience sake, an explanation for embodiments of the present invention will be given whose parts correspond to the following subject divisions.

Figure 3:
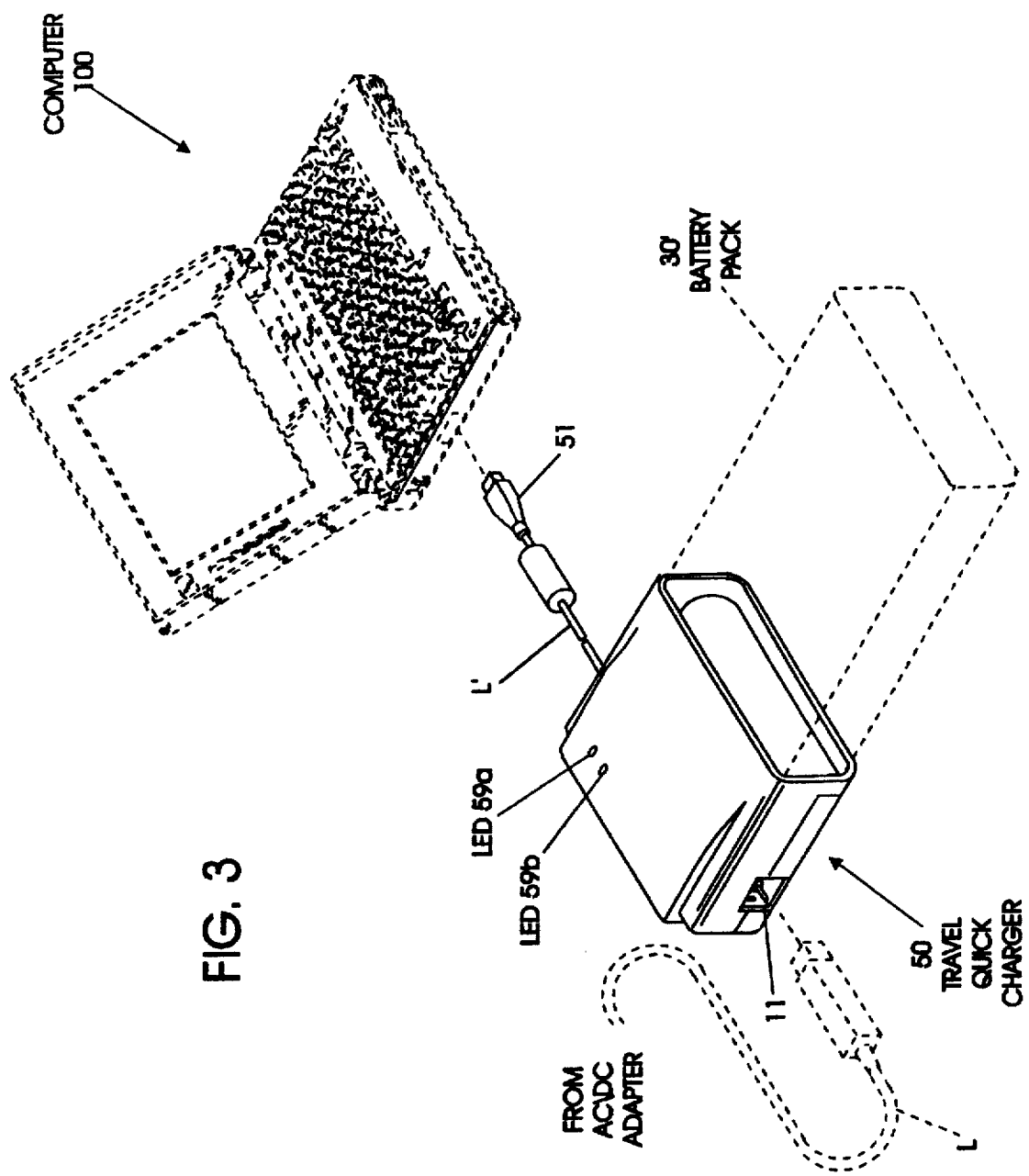
FIG. 3 is a diagram illustrating the external appearance of a battery charger according to the present invention.

A. First embodiment of the present invention
  A-1. External appearance of Travel Quick Charger
  A-2. Hardware arrangement of Travel Quick Charger
  A-3. System environment for Travel Quick Charger
  A-4. Operation of Travel Quick Charger
  A-5. Application Example
B. Second embodiment of the present invention
A. First embodiment of the present invention
A-1. External appearance of Travel Quick Charger FIG. 3 is a diagram showing the external appearance of a Travel Quick Charger 50 according to the embodiments of the present invention. As is shown in FIG. 3, the Travel Quick Charger 50 has, on one side, a connector 11 for accepting the terminal of a power supply cord L, which extends from an AC/DC adaptor 10. A power supply cord L' that extends from the other side is for coupling with a personal computer (PC) 100 at a connector 51. Since the terminals 11 and 51 of the power supply cords L and L' have the same specifications, the Travel Quick Charger 50 may be bypassed when it is not to be used, and the AC/DC adaptor 10 may be directly inserted into the PC 100. The power supply cord L', that is coupled with the PC 100, is an integral part of the Travel Quick Charger 50 in FIG. 3, but the power supply cord L' need not be integrally formed and may be designed as an independent component. If the power supply cord L' is designed to be detachable, the foot print of the Travel Quick Charger 50 can be reduced more. But if the power supply cord L' is permanently connected to the charger 50, the possibility that the cord L' could be mislaid or lost will not arise.

The Travel Quick Charger 50 is formed in a substantially rectangular parallelepiped shape, and has an opening for receiving a battery pack 30' in its front face. The battery pack 30' that can be attached into the Travel Quick Charger 50 is made to the same specifications as a battery pack 30 that is incorporated in the PC 100. The battery pack 30' is employed secondarily as a spare to compensate for the duration of the battery pack 30. A connector 31 (not shown in FIG. 3) that is provided at the rear wall of the opening. The connector 31 is for connecting to a positive side terminal, a negative side terminal, and a temperature detection terminal (which will be described later) of the battery pack 30'. In the housing of the Travel Quick Charger 50 are provided various circuits for properly distributing an output current from the AC/DC adaptor 10 for driving the PC 100 or for charging the battery pack 30' (a detailed explanation will be given later). It should be noted that, as is shown in FIG. 3, these circuits are formed separately from the AC/DC adaptor 10. Two LEDs 59a and 59b are located on the top face of the housing of the Travel Quick Charger 50. The LED 59a is used to indicate that a current is being supplied by the AC/DC adaptor 10. The color of the light that is emitted by the LED 59b, or blinking, is employed to indicate the charging status.

The Travel Quick Charger 50 does not have a circuit for AC to DC conversion (e.g., a transformer coil or a rectifying and smoothing circuit). Accordingly, as the Travel Quick Charger 50 has a small volume, it can be made compactly. When the power supply cords L and L' that are connected at the both sides are detachably provided, the foot print of the Travel Quick Charger 50 can be further reduced. Since the Travel Quick Charger 50 with the battery pack 30' is relatively small and has a simple rectangular parallelepiped shape, it is not bulky and will not occupy much space while being carried in a bag. Further, as the Travel Quick Charger 50 covers a part of the terminal portion of the battery pack 30', even if the battery pack 30 is tossed around in a user's bag and contacts foreign material (e.g., clips) composed of conductive material while being carried, short-circuiting of the electrodes of the battery pack 30' can be prevented.

When a user operates the PC 100 by using an AC power source at a hotel during the course of business trip, the user need only connect the Travel Quick Charger 50 in series between the power feed lines L and L', to charge the spare battery 30'. The connection in series of the Travel Quick Charger 50 is a simple wiring structure, so that it can prevents power supply cords from becoming tangled, and does not require the conscious effort by a user to perform charging during the operation of the PC 100.

If, the next day, a user operates the PC 100 for longer than the duration of a battery pack 30, the user can also employ the spare battery pack 30'.

A-2. Hardware arrangement of Travel Quick Charger

Figure 4:
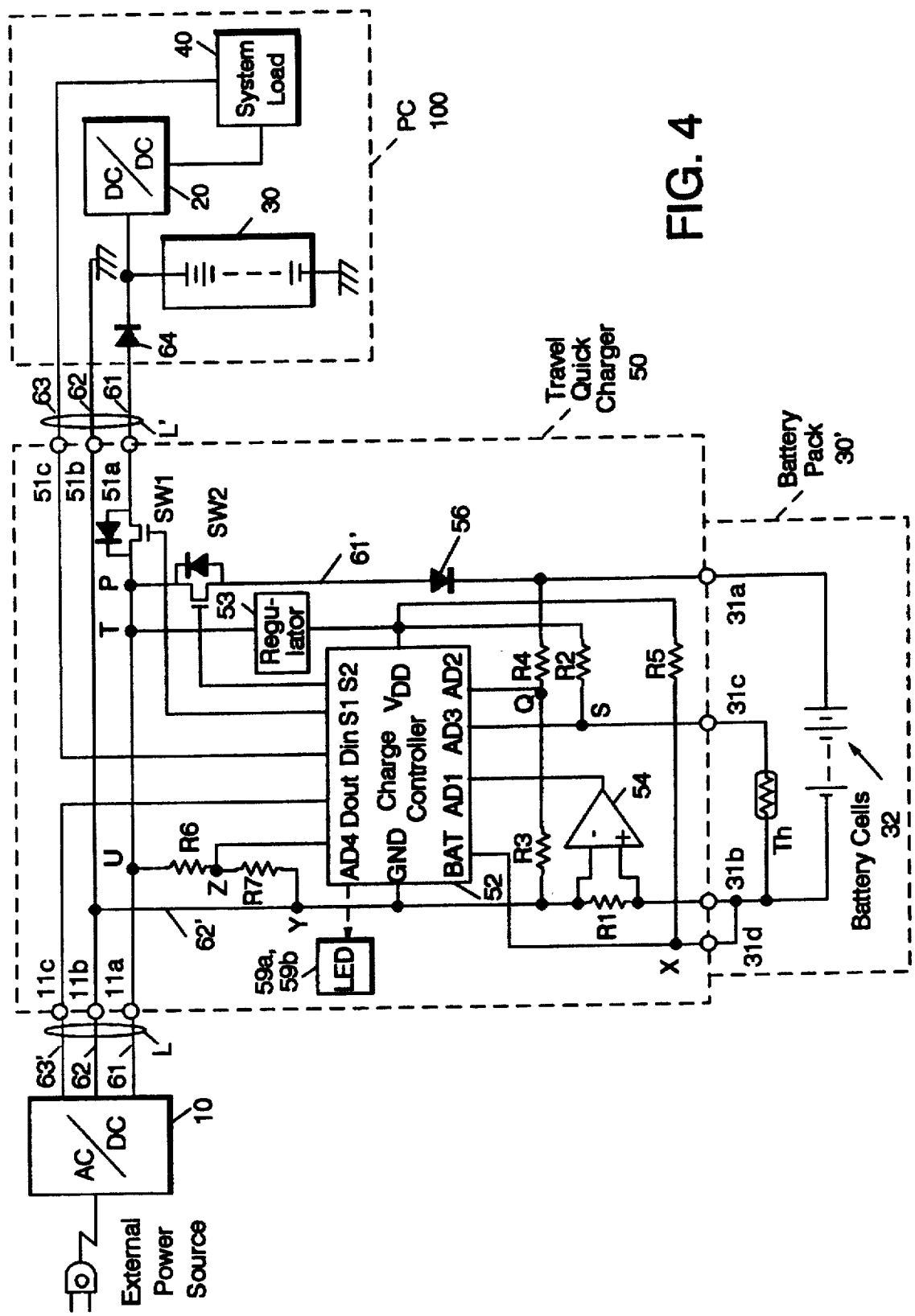
FIG. 4 is a schematic diagram illustrating the arrangement according to a first embodiment of the present invention.

FIG. 4 is a schematic diagram illustrating the arrangement of the internal circuit of the Travel Quick Charger 50 according to the first embodiment of the present invention, together with the arrangements of the AC/DC adaptor 10, the PC 100 and the attached battery pack 30'.

The battery pack 30' has the same structure as the battery 30 incorporated in the PC 100. The battery cell portion 32 is employed for actual storage of electric charges, and ordinarily a plurality of battery cells are included in a single pack. The thermistor Th, an electric device whose electric resistance varies responsive to the temperature, is provided to detect the internal temperature of the battery pack 30'. The battery pack 30' has terminals $31a$, $31b$, $31c$ and $31d$, and via these terminals can be detachably connected to the corresponding terminals of the connector of the Travel Quick Charger 50. The terminals $31a$ and $31b$ correspond respectively to the positive side terminal and the negative side terminal of the battery cell portion 32. The terminal $31c$ is at one end of the thermistor Th. The terminal $31d$ is employed to detect the existence of the battery pack 30'. The other ends of the terminals $31c$ and $31d$ are both connected to the negative side terminal $31b$. When the battery pack 30' is attached into the Travel Quick Charger 50, these terminals are grounded.

The Travel Quick Charger 50 is connected in series between the AC/DC adaptor 10 and the PC 100 by the cords L and L', and is detachable from the AC/DC adaptor 10 at the connector 11 and from the PC 100 at the connector 51. The power supply cords L and L' are constituted by two power feed lines 61 and 62 and one control signal line 63.

The power feed line 61 is used to supply the output current from the AC/DC adaptor 10 as a drive current for the PC 100, and runs from a positive side terminal $11a$ of the AC/DC adaptor 10 to a DC/DC converter 20 via a switch SW1 and a diode 64. The diode 64 is for backflow prevention. The power feed line 61 is branched at point P to provide a power feed line 61'. The power feed line 61' is used to supply a charging current to the battery cell portion 32, and is connected to the positive side terminal $31a$ of the battery cell portion 32 via a switch SW2 and a diode 56. The diode 56 is for backflow prevention. The switches SW1 and SW2 are devices to selectively connect one of the power feed lines 61 and 61' so as to enable the output current of the AC/DC adaptor to be employed either as a drive current for the PC 100 or as a charging current for the battery cell portion 32. The opening and the closing of the switches SW1 and SW2 are controlled by the charge controller 52 (which will be described later). Although, in this embodiment, the switches SW1 and SW2 are both MOS FET switches, other devices (e.g., bipolar transistors) that can perform an equivalent operation may be employed instead.

The power feed line 62 is grounded in the PC 100, and is connected to the negative side terminal $11b$ of the AC/DC adaptor 10. Further, the power feed line 62 is branched at point Q to provide a power feed line 62', which is in turn connected to the negative side terminal $31b$ of the battery pack 30'.

The control signal lines 63 and 63' are employed to detect the transition of the operating mode of the system load 40 (e.g., the change of the system 100 to power saving mode, such as a "suspend" mode).

The Travel Quick Charger 50 includes a charge controller 52; the switches SW1 and SW2; a regulator 53; an electric resistor $R_1$ and a differential amplifier 54 for detecting an output current of the battery cell portion 32; an electric resistor $R_2$ for detecting the internal temperature of the battery pack 30'; electric resistors $R_3$ and $R_4$ for detecting an output terminal voltage of the battery cell portion 32; an electric resistor $R_5$ for detecting the existence of the battery pack 30'; and electric resistors $R_6$ and $R_7$ for detecting the voltage level on the power feed line 61.

The resistor $R_1$, which is a resistor of about 20 mΩ that consumes low power consumption, is connected in series with the negative side terminal of the battery cell portion 32 and reduces voltage level that corresponds to current. The differential amplifier 54 is connected to one end of the resistor $R_1$ at its non-inversion side input terminal and to the other end of the resistor $R_1$ at its inversion side input terminal, and amplifies a reduced voltage at $R_1$ and outputs the result. The charge controller 52, which includes analog-digital converters (hereafter referred to as an "AD converter") (not shown), receives the analog output of the differential amplifier 54 at its input terminal AD1 and converts it into a digital output in order to employ the output as current data for the battery pack 30'.

The resistors $R_3$ and $R_4$ that are connected in series divide the output terminal voltage of the battery pack 30' and extract the divided voltage. One end of each of the resistors $R_3$ and $R_4$ is coupled with the negative side terminal (i.e., the GND terminal) of the battery cell portion 32 and the other end is connected to the positive side terminal of the battery cell portion 32. In other words, the voltage level at point Q corresponds to the output voltage of the battery pack 30'. The charge controller 52 includes AD converters (not shown), so that the analogue data at point Q is received at its input terminal AD2 and is converted into digital data, which serve as "voltage data".

One end of the resistor $R_2$ is connected in series with the thermistor Th via the terminal $31c$, while the other end is pulled up by the voltage $V_{DD}$ that is outputted by the regulator 53. The resistance at the thermistor Th varies in consonance with the circumferential temperature of the battery cell portion 32, so that the electric potential at point S, where the voltage is divided by the thermistor Th and the resistor $R_2$, fluctuates accordingly. The charge controller 52 includes AD converters (not shown), so that it receives the analogue electric potential at point S via its input terminal AD3 and converts it into digital data, which serve as "temperature data".

One end of the resistor $R_5$ is coupled with the terminal $31d$ and the other end is pulled up by the voltage $V_{DD}$ that is outputted by the regulator 53. Since the terminal $31d$ is connected to the negative side terminal of the battery cell portion 32 in the battery pack 30', the terminal $31d$ is grounded when the battery pack 30' is attached into the Travel Quick Charger 50. Therefore, the voltage level at the terminal $31d$ becomes low in the battery pack 30' when it is attached, and the voltage level becomes high by the voltage $V_{DD}$ when the battery pack 30' is detached. At point X the power feed line from the terminal 31d branches and the charge controller 52 receives it at the input terminal BAT and employs it to detect the existence of the battery pack 30'. The terminal 31c is connected to the end of the thermistor Th, so that the voltage level at the terminal 31c varies in consonance with the existence of the battery pack 30', the terminal 31c can also be used for the detection of the loading of the battery pack 30'. In this case, the terminal 31d may not necessarily be provided.

The resistors $R_6$ and $R_7$, which are connected in series, are employed to divide a voltage level on the power feed line 61 and to extract the divided voltage, and are inserted between point U on the power feed line 61 and point Y on the power feed line 62'. The charge controller 52, which includes AD converters (not shown), receives the voltage at point Z, converts it into digital data, and fetches the data. The voltage level on the power feed line 61 varies greatly responsive to whether the incorporated battery pack 30 in the PC 100 is being charged. This is because, when the battery pack 30 is not being charged, the output terminal voltage of the AC/DC adaptor 10 is a constant voltage (e.g., 20 V) that is sufficiently higher than the output terminal voltage of the battery pack 30, and during charging, the output terminal voltage of the AC/DC adaptor 10 is short-circuited at the output terminal of the battery pack 30 and the voltage across it is relatively low (e.g., 10 V). The charge controller 52 monitors the voltage data at point Z and determines whether or not the battery pack 30 that is incorporated in the PC 100 is being charged.

The regulator 53 supplies a stabilized drive voltage to the charge controller 52. The regulator 53 receives, at point T on the power feed line 61, part of a current that is supplied from the AC/DC adaptor 10, and transmits the output to the power supply terminal $V_{DD}$ of the charge controller 52. The charge controller 52 is coupled with the power feed line 62' at the ground terminal GND.

The charge controller 52 includes a processor that performs computation, a RAM that is employed as a work area for the processor, a ROM that is employed to store programs, and the AD converters described above.

The charge controller 52 has input terminals AD1, AD2, AD3, AD4, BAT, and $D_{in}$. The input terminals AD1, AD2 and AD3 are employed to receive current data, voltage data and temperature data for the battery pack 30'. The controller 52 can detect the completion of the charging of the battery pack 30' by using these input data (which will be described later). The input terminal AD4 is used to detect the voltage level on the power feed line 61, and this input is employed to determine whether or not the battery pack 30 in the PC 100 is being charged. The input terminal BAT is used to detect the existence of the battery pack 30'. The input terminal $D_{in}$ is employed to receive a control signal from the PC 100 that is carried by the control signal line 63. The PC 100 opens the control signal line 63 in the power-off state or in the power saving mode, and grounds the control signal line 63 during normal operation (which will be described later). Therefore, the charge controller 52 internally pulls up the terminal $D_{in}$ at the drive voltage $V_{DD}$ and can detect the operating mode of the PC 100 in consonance with the high/low level of the signal.

In addition, the charge controller 52 has output terminals S1, S2 and $D_{out}$. The output terminals S1 and S2 are employed to open and close the FET switches SW1 and SW2 and are connected to the gate terminals of the FET switches SW1 and SW2, respectively. The charge controller 52 opens or closes the switches SW1 and SW2 by referring to the operating mode of the system 100 and to the charged state of the battery pack 30', so that the supply of a drive current to the PC 100, or the supply or the supply of a charging current to the battery pack 30' can be controlled (see subject division A-4 for a detailed explanation). When, from the data that is inputted at the terminal BAT, the charge controller 52 detects that the battery pack 30' is not attached, the SW2 should be turned off. The leakage from the terminal 31a of a current and the short-circuiting of the electrodes by contacting foreign material can be prevented. The output terminal $D_{out}$ is employed to prepare a signal (i.e., an OPEN or a GND signal) that is equivalent to the signal at the input terminal $D_{in}$ and to pass it across the control signal line 63' to the AC/DC adaptor 10. It should be noted that, when the AC/DC adaptor 10 does not require information concerning the operating mode of the PC 100, data at the $D_{out}$ does not have to be output.

The charge controller 52 employs the LED 59a and 59b to indicate that the battery pack 30' is being charged or that the charging has completed, (as is described above). Since the employment of the LED 59 to indicate an operational state, etc., is well known, and since this is not related to the subject of the invention, a detailed explanation for it will not be given.

A-3. System environment for Travel Quick Charger
A-3-1. Computer

Figure 5:
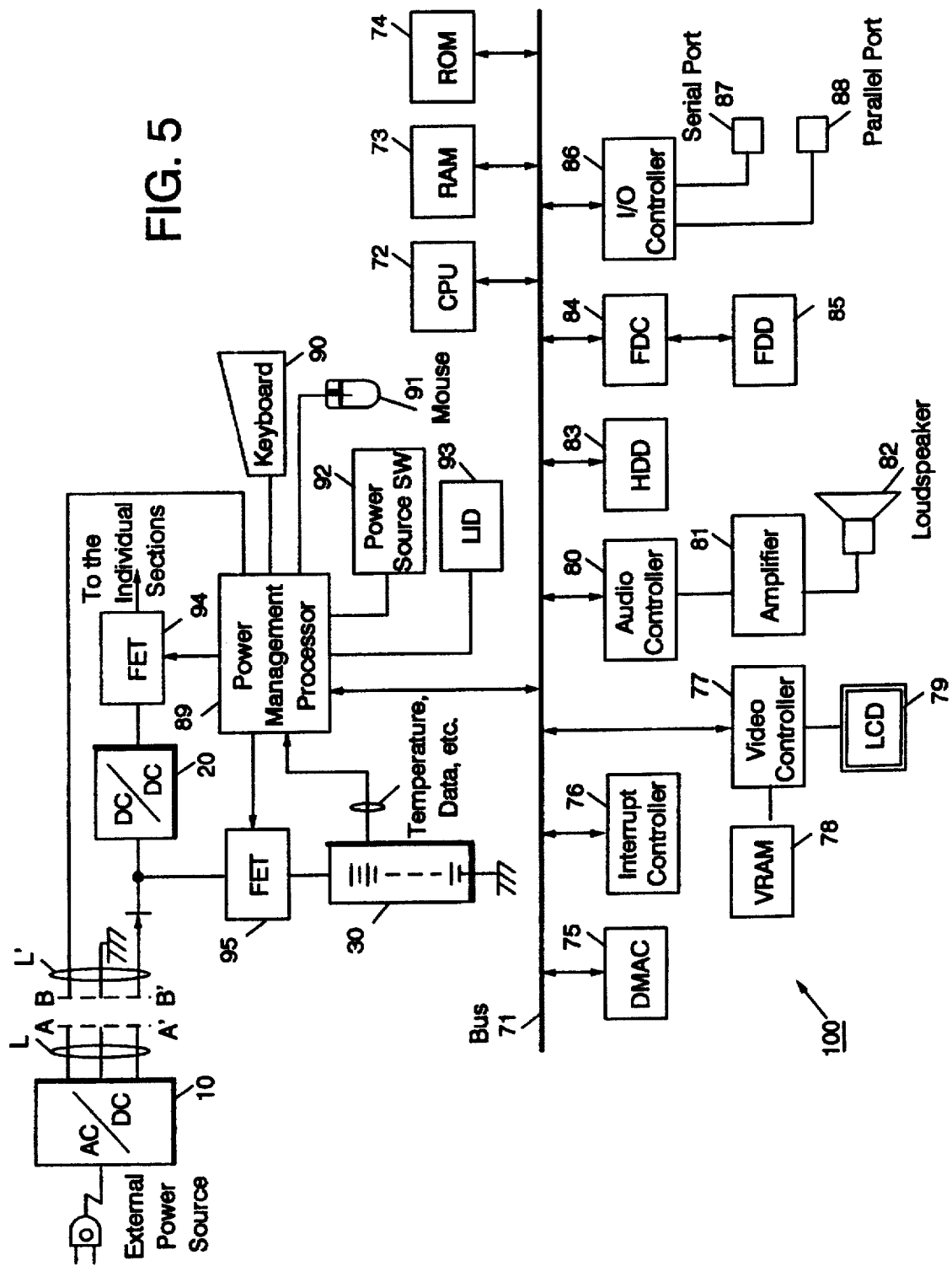
FIG. 5 is a detailed diagram of FIG. 3, showing the hardware arrangement of the computer 100 that can employ the battery charger according to the first embodiment.

FIG. 5, a detailed diagram of FIG. 4, illustrates the hardware arrangement of the computer 100 that can use the Travel Quick Charger 50. In FIG. 5, the PC 100 is connected to the AC/DC adaptor 10 by the power supply cords L and L'. The cords L and L' are intersected by line segments A-A' and B-B'; however, it would be understood that the Travel Quick Charger 50 can be inserted as needed between the line segments A-A' and B-B' or that a connection to form a short circuit is possible. In the PC 100, the power feed line 61 is connected via the backflow prevention diode 64 to the DC/DC converter 20, which in turn is driven by a current that is supplied by the AC/DC adaptor 10 or the battery 30.

In the PC 100, a main processor (CPU) 72 executes an application program under the control of an operating system (OS). The main processor 72 communicates with the individual devices via a transfer path (bus) 71 having common signals, such as address signals, data signals, and control signals.

A main memory 73 is a volatile memory (RAM) that is employed to load the programs and serves as a work area for the main processor 72. A ROM 74 is a non-volatile memory that is employed to permanently store a coded program (POST) that is executed when the system 100 is powered on, and a coded hardware control program (BIOS). A DMA controller 75 is a special processor that transfers data between the main memory 73 and a peripheral device without the involvement of the main processor 72. An interrupt controller 76 constantly monitors the bus 71, and in response to the occurrence of interrupt request, the controller 76 reports it to the main processor 72. A video controller 77 is a processor for handling a drawing command from the main processor 72. A VRAM 78 is a memory for temporarily storing drawing data that are being processed. An LCD (liquid crystal display) 79 displays the contents of the VRAM 78. An audio controller 80 is a processor that handles the input and output of an audio signal. The audio controller 80 amplifies an audio signal by using an amplifier 81, for example, and outputs the amplified signal through a speaker 82. An HDD 83 and an FDD 85 are auxiliary storage devices. An FDC 84 is a controller for driving the FDD 85. An I/O controller 86 performs serial data input/output via a serial port 87, and parallel data input/output via a parallel port 88, respectively. The system 100 also includes a keyboard 90 and a mouse 91 that are employed for data input by a user. A power switch 92 is employed to power on the entire system 100. A switch 93 is employed to detect as an electric signal the opening and closing of a lid that is integrally formed with the LCD 79.

The component blocks 71 through 88, and 90 through 93 are well known and are commonly provided for a personal computer. Although the other well known hardware components and an interface circuit are required to constitute a computer, it would be understood by one having ordinary skill in the art. For convenience sake no explanation for them is given in this specification.

The PC 100 in the first embodiment has a power management function. Power management is a function that saves the power consumption by halting as needed the supply of power to the individual sections of the system load 40. At present, personal computers that are sold by IBM Japan, Ltd., and many other portable electric and electronic devices incorporate this function. The most specific example of a power saving mode is a "suspend". The "suspend" mode is literally the halting of the execution of an application program. More specifically, when a given event* occurs, data** that are required for resuming the execution of the application program at the same point as suspend are saved in the main memory, and the power supply to almost all the circuits, except for the main memory, is halted.

In order to perform power management in a desirable manner, the PC 100 in the first embodiment has a power management processor 89 in addition to the above described hardware components. The power management processor 89 supports the main processor 72 in the management of the power supply to the system load 40 and the mode transition of the system 100.

One of the functions of the power management processor 89 is to control the charging of the incorporated battery pack 30 by opening and closing the FET switch 95. For this purpose, the processor 89 receives, from the incorporated battery pack 30, the data concerning current, voltage, and temperature, and monitors the charged state of it.

Another function of the power management processor 89 is to report, to the main processor 72, the occurrence of a given event* that necessitates entering the suspend mode. More specifically, the power management processor 89 monitors an input matrix of the keyboard 90, the coordinates pointed at by the mouse 91, the state of the cover (LID) 93 of the notebook computer, and the voltage of the battery 30. Upon the detection of an occurrence of a given event*, the power management processor 89 outputs interrupt request across the bus 71. The interrupt controller 76 detects the interrupt request and reports it to the main processor 72. When the main processor 72 realizes that the interrupt request is issued by the power management processor 89, the main processor 72 halts the execution of the application program, stores in the main memory 73 data** that are required for the program to resume its execution, and then transmits to the power management processor 89 a command to halt the power supply to all the components other than the main memory 73. The power management processor 89 opens the FET switch 94 and halts the supply of power from the DC/DC converter 20, so that the power supply is halted to all the components except for the main memory 73. By means of the above described operation sequence, the PC 100 enters the suspend mode.

In the power-off state or in the suspend mode (i.e., in the period during which the system 100 is being powered down), the power management processor 89 opens the control signal line 63. During normal operation, the power management processor 89 grounds the control signal line 63. The charge controller 52 receives a control signal across the control signal line 63 and pulls it up internally (not shown). Thus, during the normal operation, the voltage at the input terminal $D_{in}$ goes low. In the power-off state or in the suspend state, the voltage at the terminal $D_{in}$ goes high. Thus the charge controller 52 can detect the operating mode of the PC 100.

A processing program sequence for entering the suspend mode and for resuming from the suspend mode is coded and stored in the ROM 74, for example.

The suspend function and the power management processor are already well known. Such a power management processor is described in, for example, the specifications for Japanese Patent Application No. Hei 04-54955 (our company reference number: JA9-92-004) and for Japanese Patent Application No. Hei 04-246338 (JA9-92-029), both of which are assigned to the present applicant; and the notebook computers "ThinkPad 700C," which are sold by IBM Japan, Ltd., include a control chip that is equivalent to the power management processor 89. In other words, the hardware arrangement of the PC 100 is not needed to be innovated in applying to the Travel Quick Charger 50.

It should be especially noted that it is premised that the PC 100 possess the following two capabilities in order for the Travel Quick Charger 50 to be employed:

(1) when a given event* occurs, the PC 100 enters the power saving mode; and (2) the PC 100 can output externally a signal indicating the mode transition.

*: A given event because of which the system 100 enters the suspend mode is, for example, that no input shall have been made by a user for a predetermined period of time or longer, that a hot key (or a combination of function keys) shall have been input, that the LID 93 of the notebook computer shall have been closed, or that the voltage of the battery 30 shall have fallen below a predetermined value while being driven by the battery 30.

**: Data that are required for resuming from the suspend mode are, for example, the contents of the VRAM, the value of the I/O registers, and the state of the CPU.

A-3-2. AC/DC adaptor

Figure 6:
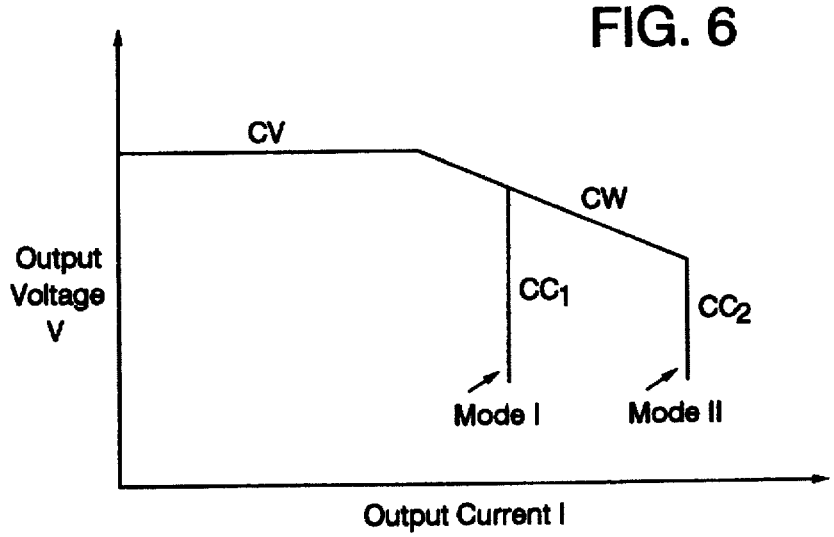
FIG. 6 is a graph showing the output (I-V) characteristic of an AC/DC adaptor that can be connected to the battery charger according to the first embodiment.

The AC/DC adaptor 10 converts AC voltage into DC voltage and outputs the converted voltage, and has a CV-CW-CC output characteristic, for example. The CV denotes a constant voltage output, the CW denotes a constant wattage output, and the CC denotes a constant current output. FIG. 6 is a graph showing the (I-V) output characteristic of the AC/DC adaptor 10 at the terminal 11a.

In a period, for example, during which the battery pack 30 incorporated in the PC 100 is not being charged, the AC/DC adaptor 10 is operated in the CV area in which a voltage is relatively high, and varies output current I in consonance with the power that is supplied to the system load 40. When the incorporated battery pack 30 is being charged, the voltage at the terminal 11a is maintained low because of the terminal voltage of the battery pack 30. Since the charging of the battery is performed with a constant current, the AC/DC adaptor 10 is operated in the CC area during the charging, and varies the output voltage V as the terminal voltage of the battery pack 30 is increased.

As is shown in FIG. 6, the AC/DC adaptor 10 in this embodiment has two CW and CC areas, i.e., mode I and mode II. Mode I is a mode for charging the battery 30 in the power-off state or in the suspend state. In this mode, the CC operation is performed at a relatively low current value ($CC_1$) to protect the battery 30 from an overflow of a charging current. Mode II is a mode for charging the battery 30 during the normal operation of the PC 100. In this mode, the CC operation is performed at a relatively high current value ($CC_2$) in order to supply sufficient power to the system load 40 and to use excess power for the charging of the battery 30. When the AC/DC adaptor 10 receives a control signal from the terminal 11c across the control signal line 63', the operating mode of the adaptor 10 is determined, among mode I and mode II.

The above described AC/DC adaptor 10 is already well known. The same AC/DC adaptor is disclosed, for example, in the specification for Japanese Patent Application No. Hei 04-246338 (our company reference number: JA9-92-029) that is assigned to the present applicant. Further, the same AC/DC adaptor as is described above is employed for the "ThinkPad 700C" that is sold by IBM Japan, Ltd. No more detailed explanation of the AC/DC adaptor 10 will therefore be given here. It should be noted that the above described AC/DC adaptor 10 is merely one example component that can be applied for the Travel Quick Charger 50, and that the present invention is not limited to the use of this component.

Although the AC/DC adaptor may not have the two output modes, it can be applied for the Travel Quick Charger 50 according to the first embodiment (in such case, the control signal line 63 is merely not employed). It would be understood that any AC/DC adaptor can be applied for the Travel Quick Charger 50 if the adaptor has an output characteristic, such as CVCC or CVCW, that is suitable for the charging of a battery.

A-4. Operation of Travel Quick Charger

Figure 7:
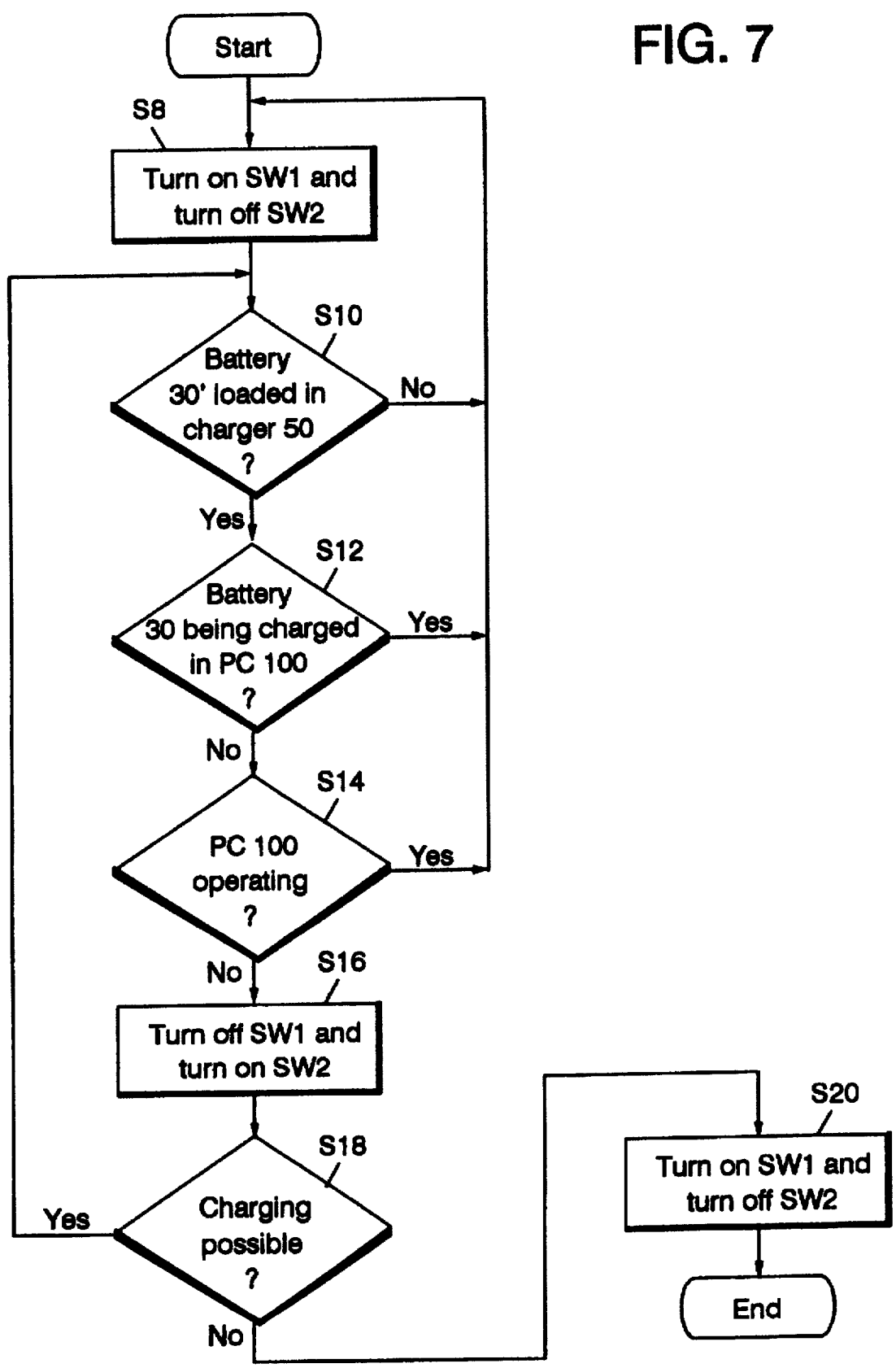
FIG. 7 is a flowchart showing the charging operation that is performed by the battery charger according to the first embodiment.

The arrangements of the Travel Quick Charger 50, and the PC 100 and the AC/DC adaptor 10 that employ the Travel Quick Charger 50 have been explained in the preceding divisions. In this subject division, the operation of the Travel Quick Charger 50 will be explained. FIG. 7 is a flowchart for the operation of the Travel Quick Charger 50 for charging of the battery 30'. The individual steps will now be explained in detail.

At step S8, the switch SW1 is turned on and the switch SW2 is turned off. This is because leakage from the terminal 31a should be prevented when the battery pack 30' is detached.

At step S10, a check is performed to determine whether or not the battery pack 30' is attached into the Travel Quick Charger 50. The charge controller 52 can make this decision by examining the input at the terminal BAT (previously described). If the result obtained at the decision block is affirmative, program control branches to "Yes" and advances to step S12. If the result is negative, program control branches to "No" and returns to step S8, where it goes on standby until the conditions are changed.

At step S12, a check is performed to determine whether or not the battery pack 30 incorporated in the PC 100 is being charged. The charge controller 52 can make this decision by examining the input at the terminal AD4. If the result obtained at the decision block is negative, program control branches to "No" and advances to step S14. If the result is affirmative, program control branches to "Yes" and returns to step S8, where it goes on standby until the conditions are changed.

At step S14, a check is performed to determine whether or not the PC 100 is in the normal operational state, or is in the suspend mode or the power-off state. The charge controller 52 can make this decision by examining the control signal 63 that the power management processor 89 outputs (previously described). If the PC 100 is in the normal operating mode (the control signal line 63 is grounded), program control branches to "Yes" and returns to step S8, where it goes on standby until the conditions are changed. If the PC 100 is in the suspend mode or the power-off mode (the control signal line 63 is opened), program control branches to "No" and advances to step S16.

When the result at decision block S14 is "No", it means that the power supply to PC 100 is not required, and thus the output of the AC/DC adaptor 10 can be used to charge the spare battery pack 30'. At step S16, the charge controller 52 turns off the switch SW1 and turns on the switch SW2.

At step S18, a check is performed to determine whether or not the battery pack 30' is fully charged***. The decision as to whether or not the battery pack 30' is fully charged is made by the charge controller 52 by examining the current data that are inputted at the terminal AD1, the voltage data that are inputted at the terminal AD2, and the temperature data that are input at the terminal AD3. If the battery pack 30' is fully charged, program control branches to "No" and advances to step S20. If the battery pack 30' is not fully charged, the charging is continued while the states of the switches SW1 and SW2 are maintained, and program control returns to step S10 to monitor at the same time the states at the other decision steps S10, S12 and S14. If there is a change in the result at any decision block (e.g., the system 100 has resumed the operation, or the battery pack 30' was detached during the charging), program control returns to step S8 where the switch SW2 is turned off and the charging is halted.

The procedure at step S20 corresponds to the completion of the charging operation. In other words, the switch SW1 is again turned on and the switch SW2 is again turned off, and the series of processes is terminated.

It is assumed that the charge controller 52 shall actually execute the above charging operation according to the program stored in it.

***: The requirements for determining the completion of charging differ according to the types of battery cells. For example, for NiMH battery, the completion of charging can be detected by examining whether or not the internal temperature T of the battery cell 32 has reached equal to or higher than a predetermined value (e.g., 60° C. or above), or whether or not the temperature increase T has reached a level that is equal to or higher than a predetermined value (25° C. or above). For NiCd battery, the completion of charging can be determined when a voltage is slightly reduced following a period during which it was continuously increased. Methods for detecting the completion of battery charging are already well known, and it would be understood by one having ordinary skill in the art that the charge controller 52 may adopt one of the optimal detection methods in consonance with the type of battery cell.

A-5. Modification

Figure 8:
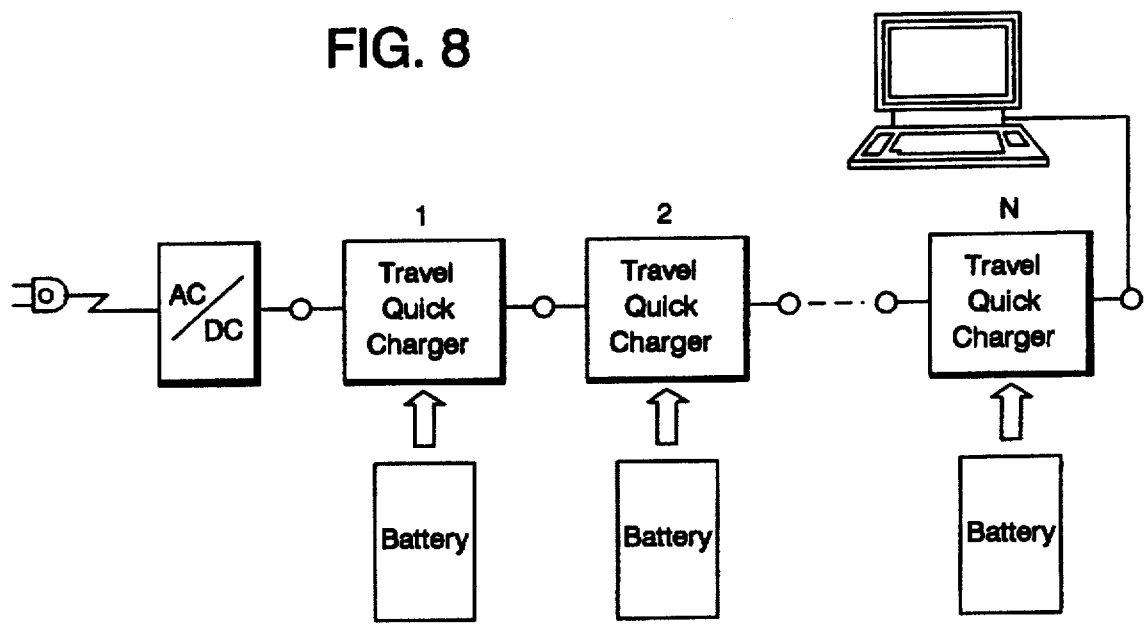
FIG. 8 is a diagram showing a plurality of chargers connected in series according to the present invention.

FIG. 8 is a diagram showing a modification to a single unit charger arrangement discussed thus far.

Figure 1A:
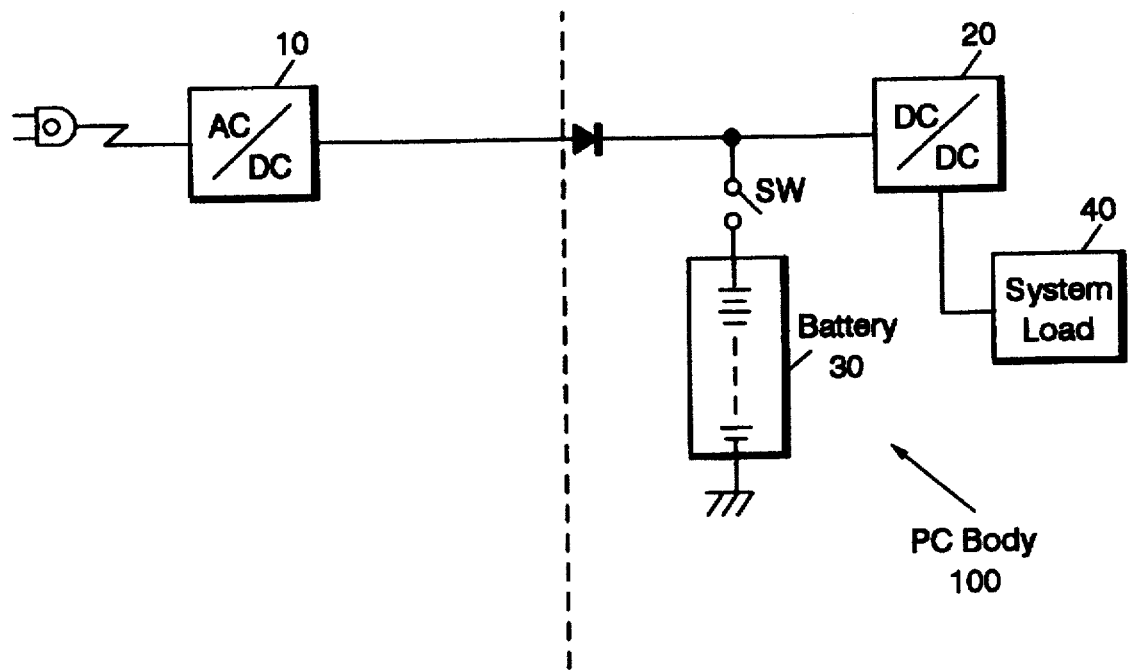
FIG. 1(a) is a diagram illustrating the arrangement of a power supply system for a conventional electric/electronic device.
Figure 1B:
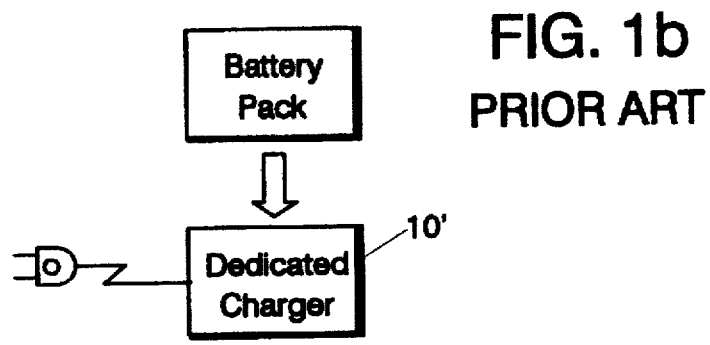
FIG. 1(b) is a diagram showing the mode in which a conventional quick charger with an AC/DC adapter is used.
Figure 2:
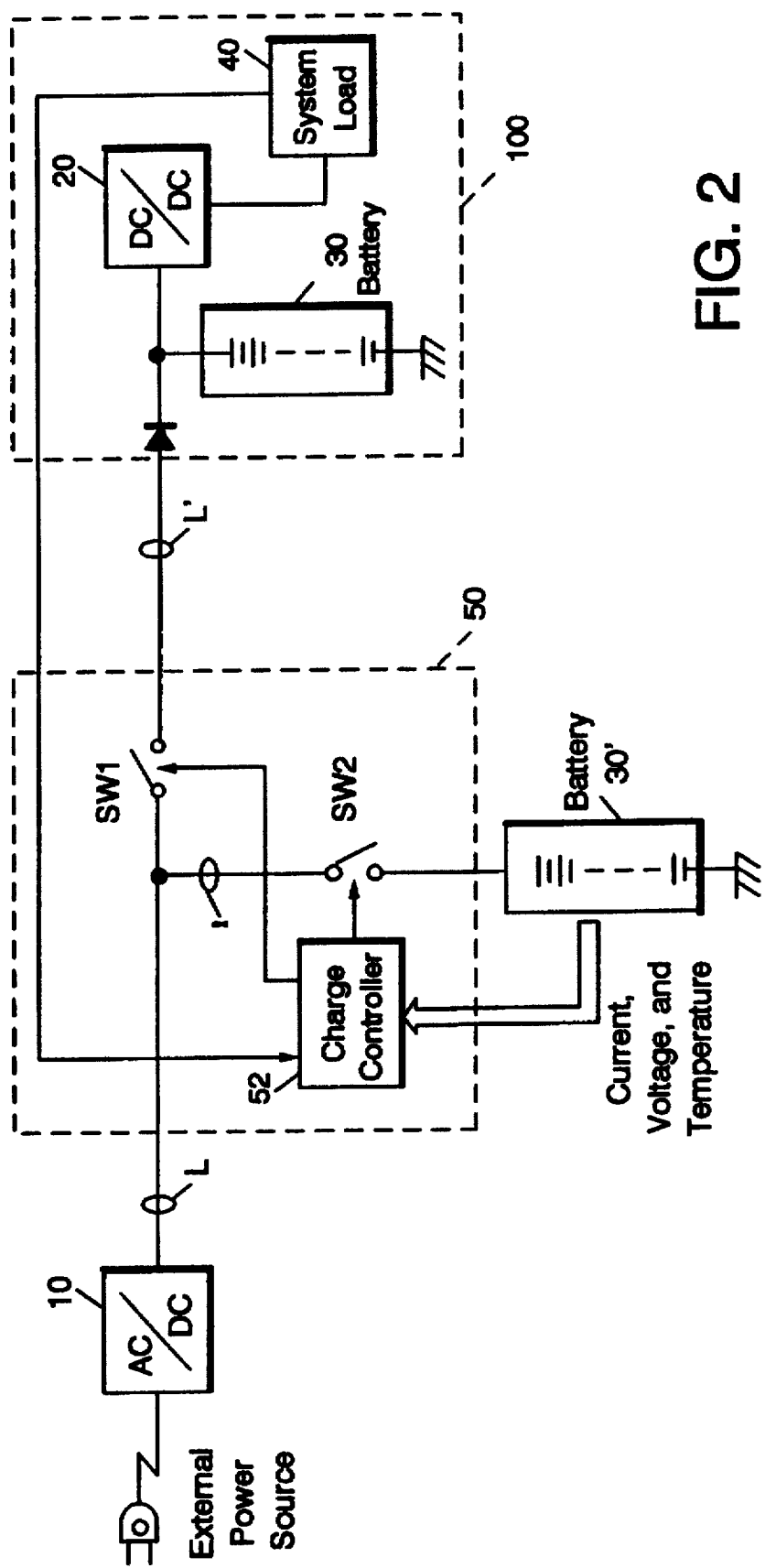
FIG. 2 is a block diagram illustrating the arrangement of a battery charger according to one aspect of the present invention.

Although the insertion of only one Travel Quick Charger 50 is illustrated in FIGS. 1 through 3, it would be understood by one having ordinary skill in the art that a plurality of Travel Quick Chargers 50 can be connected in series for the operation. A user, therefore, can increase the number of Travel Quick Chargers in consonance with the number of spare battery packs.

B. Second embodiment of the present invention

A second embodiment of the present invention will now be explained that can be applied to a battery pack having a different specification from that of the battery pack described in subject division A. From the following explanation, it should be noted that in the second embodiment, a so-called "Intelligent Battery" is employed that can measure its remaining capacity and reports externally the completion of the charging.

Figure 9:
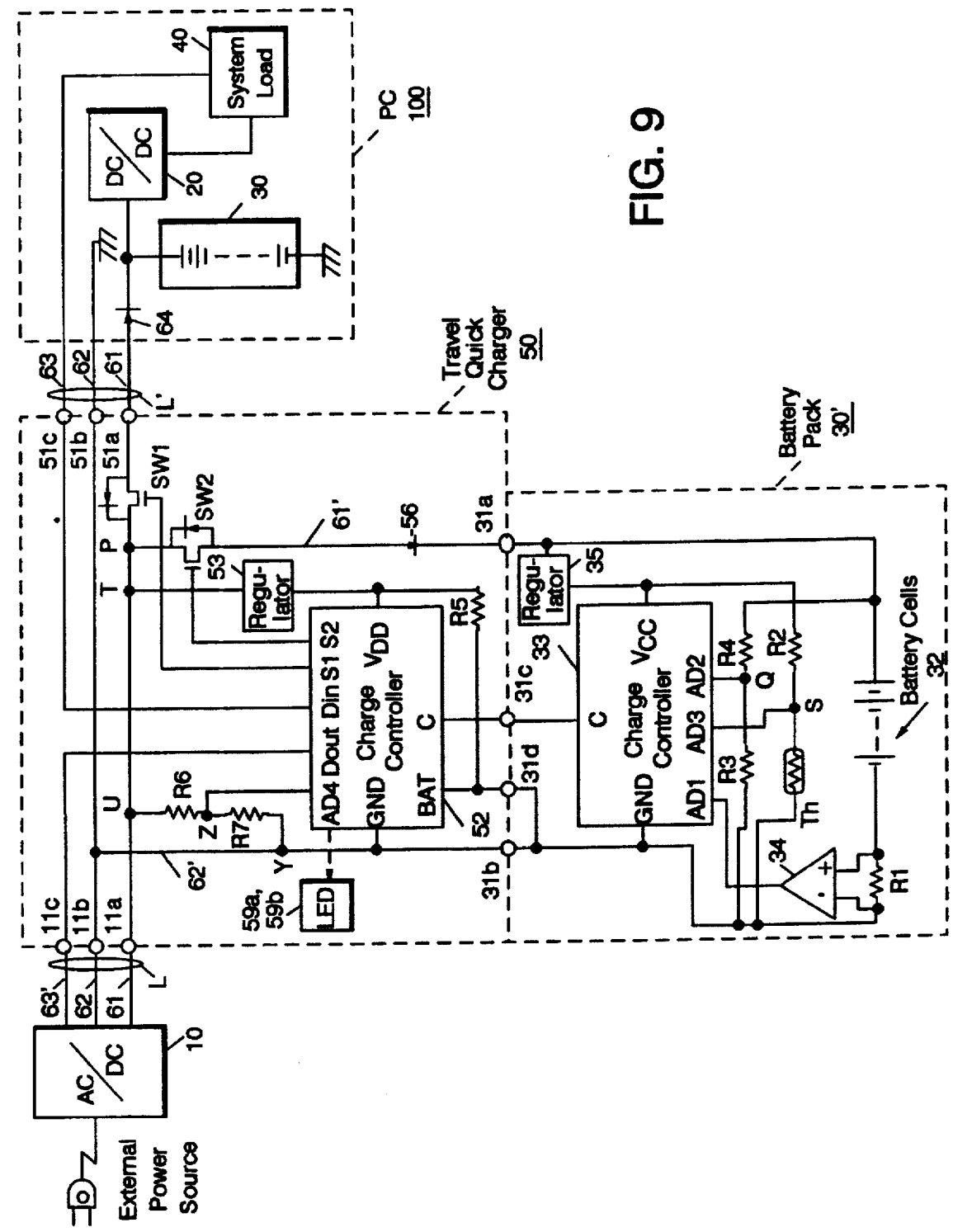
FIG. 9 is a schematic diagram illustrating the arrangement according to a second embodiment of the present invention.

FIG. 9 is a schematic diagram illustrating the arrangements of the internal circuit of a Travel Quick Charger 50 according to the second embodiment of the present invention, together with that of an AC/DC adaptor 10, a PC 100, and a battery pack 30' that has been attached.

The battery pack 30' has the same structure as that of a battery 30 incorporated in the PC 100. The battery pack 30' includes a battery cell portion 32, for accumulating electric charges; an electric resistor $R_1$ and a differential amplifier 34, for detecting the output current of the battery cell portion 32; a thermistor Th and an electric resistor $R_2$, for detecting the internal temperature of the battery pack 30'; electric resistors $R_3$ and $R_4$, for detecting the output terminal voltage of the battery cell portion 32; a capacity controller (also called "Fuel Gauge") 33, for measuring the remaining capacity of the battery cell portion 32; and a regulator 35, for supplying stabilized power to the capacity controller 33. The connections of the individual components (the differential amplifier 34, the resistors $R_1$, $R_2$, $R_3$ and $R_4$) for detecting a current, a voltage, and a temperature of the battery cell portion 32 are almost identical to those of corresponding components in FIG. 4. The capacity controller 33 employs the regulator 35 to stabilize the output terminal voltage of the battery cell portion 32 and accepts the stabilized voltage at its power terminal $V_{CC}$, and receives, at its GND terminal, the voltage from the negative side terminal of the battery cell 32. In addition, the capacity controller 33 has AD converters (not shown), so that the output of the differential amplifier 34 and the output at points Q and S are digitized and fetched as current data, voltage data, and temperature data, respectively. The capacity controller 33 detects the completion of charging the battery cell portion 32 in the same manner as does the charge controller 52 in the first embodiment (e.g., explained in detail at step S18 in subject division A-4), and outputs the detection result as serial data from the output terminal C.

The battery pack 30' has four terminals 31a, 31b, 31c and 31d. The terminal 31a is a positive side terminal, the terminal 31b is a negative side terminal, and the terminal 31d is a terminal for the detection of the existence of a battery, which are the same as those in the first embodiment. The terminal 31c is employed to transmit the output at the terminal C of the capacity controller 33 to the Travel Quick Charger 50.

Differences in the Travel Quick Charger 50 according to the second embodiment from that in the first embodiment are that raw data, such as current data, voltage data and temperature data of the battery pack 30', are not fetched, and that the completion of the charging of the battery cell portion 32 is not detected by the Travel Quick Charger 50. The Travel Quick Charger 50 in this embodiment accepts just the report of the completion of the charging outputted by terminal C of the capacity controller 33 via the terminal C, and opens or closes the switches SW1 and SW2 responsively.

The PC 100 and AC/DC adaptor 10 described in the division A-3 can also be applied for the second embodiment.

The charging operation sequence for the Travel Quick Charger 50 according to the second embodiment is the same as that which is described in the flowchart in FIG. 7. The decision, that is made at step S18, of the completion of the charging relies only on the output from the terminal C of the capacity controller 33 in the battery pack 30'.

It would be understood by one having skill in the art that the Travel Quick Charger 50 according to the second embodiment, as well as according to the first embodiment, can be connected in series as is shown in FIG. 8.

The intelligent battery is already known, and is disclosed, for example, in the specification for Japanese Patent Application No. Hei 05-184098 (our company reference number: JA9-93-032) that is assigned to the present applicant. In addition, the same intelligent battery as is described above is provided for use in the notebook computer "ThinkPad 750" that is sold by IBM Japan, Ltd.

C. Third embodiment of the present invention

A third embodiment of the present invention will now be described.

The present invention has been described in detail by employing a personal computer as an electric/electronic device in the above embodiments. However, the present invention is not limited to that device, and can be applied to various types of cordless devices, such as portable telephones, cordless telephones and video cameras, and battery operated electric/electronic devices, such as word processors. (It should be obvious to one having ordinary skill in the art that various modifications or revisions of the embodiments are possible within the scope of the present invention.) That is, although the present invention has been disclosed by using an example, it should not be limited to that example. To understand the subject matter of the present invention, the claims should be referred to.

As is described above, since a battery charger according to the present invention can be inserted in series into a power feed line that lies between an AC/DC adaptor and an electric/electronic device, the wiring arrangement is not complicated and a spare battery can be automatically charged. Since the charging is performed only during a period in which power consumption by the electric/electronic device is low, the charging operation does not affect the system operation.

As the battery charger does not require AC to DC conversion circuit (e.g., a transformer coil or a rectifying and smoothing circuit), it is compact and light and is suitable for use with a portable device. Further, when the spare battery pack is carried with being attached into the battery charger, the volume is not great, and as the terminal portions of the battery can be covered and are protected from coming into contact with foreign conductive material, the possibility that the electrodes of the battery will be short-circuited can be prevented.

To use a PC while staying at a hotel on a business trip, a user need merely connect in series an AC/DC adaptor, a Travel Quick Charger, and a PC in the named order by using a power supply cord. No other special manipulation is required, and the charging of a spare battery pack can be completed by the following morning. Even at a site where there is no commercially available power supply, a user can use both an incorporated battery pack and a spare battery pack. Since a spare battery is attached into a Travel Quick Charger while it is carried in a bag, the terminal portion of the battery can be covered and short circuits do not therefore occur, even if the battery is tossed around in the bag. Since the Travel Quick Charger is a compact charger that does not include an AC/DC conversion portion, it is not difficult for a user to carry.

What is claimed is:

1. A battery charger, comprising:
    means for connecting in series to a first power feed line along which an AC/DC adaptor supplies a drive current to an electric/electronic device;

a first switch for connecting and disconnecting said first power feed line to said electric/electronic device;

a second power feed line that is connected in parallel with said first power feed line to supply at least a part of said drive current as a charging current for a battery;

a second switch for connecting and disconnecting said second power feed line to said first power feed line; and a charge controller for controlling the opening and the closing of said first switch and said second switch.

2. The battery charger according to claim 1, wherein said charge controller monitors said power consumption state of said electric/electronic device, and measures a remaining capacity of said battery by employing detection values for a voltage, a current, and a temperature of said battery, wherein, when consumed power of said electric/electronic device is high or when said battery is in a fully charged state, said charge controller closes said first switch and opens said second switch, and wherein, when said consumed power of said electric/electronic device is low said battery is not in said fully charged state, said charge controller opens said first switch and closes said second switch.

3. The battery charger according to claim 1, wherein said charge controller monitors said operating mode of said electric/electronic device, and measures a remaining capacity of said battery by employing detection values for a voltage, a current, and a temperature of said battery, wherein, when said electric/electronic device is in a normal operating mode, or when said battery is in a fully charged state, said charge controller closes said first switch and opens said second switch, and wherein, when said electric/electronic device is in a low power consumption mode, or when power is off and said battery is not in said fully charged state, said charge controller opens said first switch and closes said second switch.

4. The battery charger according to claim 1, wherein said charge controller monitors said operating mode of said electric/electronic device, and measures a remaining capacity of said battery by employing detection values for a voltage, a current, and a temperature of said battery, wherein, when said electric/electronic device is in a normal operating mode or is charging a battery that is incorporated in said electric/electronic device, or when said battery is in a fully charged state, said charge controller closes said first switch and opens said second switch, and wherein, when said electric/electronic device is in a low power consumption mode, or when power is off and said battery is not in said fully charged state, said charge controller opens said first switch and closes said second switch.

5. A battery charger, comprising:

means for connecting in series to a first power feed line along which an AC/DC adaptor supplies a drive current to an electric/electronic device;

a second power feed line which is connected in parallel with said first power feed line for supplying at least a part of said drive current to a battery;

a switch for connecting and disconnecting said second power feed line to said first power feed line; and a charge controller for opening and closing said switch by monitoring a current and a voltage across said first power feed line, and a current, a voltage and a temperature of said battery.

6. The battery charger according to claim 5, wherein said charge controller opens said switch when the intensity of said current across said power feed line falls below the minimum permissible charging current, when the intensity of a current that is supplied across said first power feed line falls below the power required for the operation of said electric/electronic device, or when said battery is in a fully charged state, and closes said switch in the other period.

7. The battery charger according to claim 1 to 6, covering only one part of said battery, including a terminal portion.

8. The battery charger according to claim 1 to 6, which has no circuit for converting an alternating current voltage into a direct current voltage and which is connected detachable with said AC/DC adaptor and said electric/electronic device.

* * * * *